R. W. GOFF.
STARTING AND LIGHTING SET FOR AUTOMOBILES.
APPLICATION FILED AUG. 30, 1915.
1,264,634.
Patented Apr. 30, 1918.
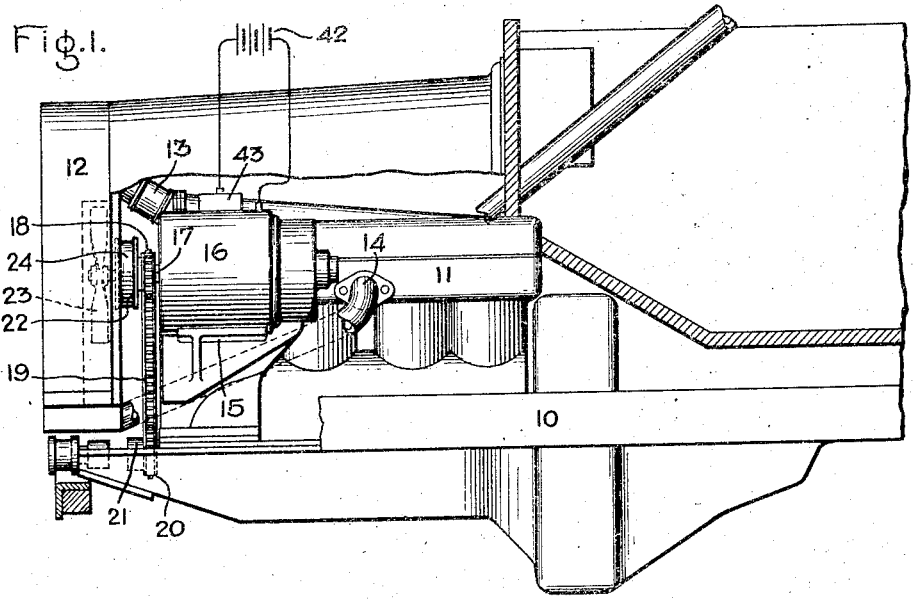
Inventor:
Robert W. Goff,
by [signature]
His Attorney.

UNITED STATES PATENT OFFICE.

ROBERT W. GOFF, OF SCHENECTADY, NEW YORK, ASSIGNOR TO GENERAL ELECTRIC COMPANY, A CORPORATION OF NEW YORK.

STARTING AND LIGHTING SET FOR AUTOMOBILES.

1,264,634.  Specification of Letters Patent.  Patented Apr. 30, 1918.

Application filed August 30, 1915. Serial No. 47,954.

*To all whom it may concern:*

Be it known that I, ROBERT W. GOFF, a citizen of the United States, residing at Schenectady, county of Schenectady, State of New York, have invented certain new and useful Improvements in Starting and Lighting Sets for Automobiles, of which the following is a specification.

There are at the present time starting and lighting sets for automobiles comprising a dynamo-electric machine which acts as a motor to start the automobile engine and later is driven by the engine as a generator to furnish current for the light and storage battery. Between the shaft of a dynamo electric machine and that of the engine is a driving means or connection commonly a chain with coöperating sprockets.

As is well known, the speed of an automobile engine in service is very widely varied, and also very suddenly varied. Where the machine and engine shafts are positively geared together, this gives rise to shocks of greater or less magnitude due to the inertia of the driven member which tends to maintain its then operating speed. At times these shocks are great enough to break or seriously injure the driving connection between the two. At other times, it results in slatting of the driving chain which causes objectionable noise and subjects it to undue stresses that decrease its life.

Another factor to be specially considered is the difference in torque that is transmitted by the driving means when the dynamo-electric machine is acting as a motor on the one hand, and as a generator on the other. On the Ford car for example, the starting torque under ordinary conditions is about sixty foot pounds at the engine. The torque necessary to drive the machine as a generator varies with the speed. At twenty-five miles per hour of the car the torque is about two foot pounds at the engine. That is to say, it is thirty times greater in one case than in the other. When the ventilating fan is also driven through the driving means or connection, aforesaid, the torque required is about three foot pounds at the engine. This force is substantially constant because the torque required to drive the dynamo-electric machine decreases and that to drive the fan increases with the speed. These figures are given merely as illustrations and are not in any way to be considered as limitations.

When the fan is driven through the aforesaid driving means (an arrangement that is desirable for various reasons) it is of the utmost importance that there be no slip between the engine and the fan because to keep the engine properly cooled the fan speed must change with engine speed. This is evident from the fact that if the water boils out of the radiator the engine may be seriously injured.

I have solved the problem above outlined by providing in the driving means or connection a transmission of power which, for all practical purposes, is non-yielding when driven in one direction and is sufficiently yielding when driven in the opposite direction to absorb the variations due to sudden changes of angular speed of the engine and in this manner prevent slatting of the transmission chain and excessive strains thereon. One way of looking at the matter is that I have provided a cushioning device which, while transmitting motion in both directions, does so positively under one condition and elastically under the other. When spur gearing is used as the driving means the advantages will still be present but are not quite so evident to the eye.

The invention will be described in connection with a Ford car since it has particular advantages in connection therewith, but it is not limited thereto.

In the accompanying drawing, Figure 1 is a view in side elevation of the front end of an automobile; Fig. 2 is a cross-sectional view of the cushioning device; Fig. 3 is a face view of the same; Fig. 4 is an end elevation of the cushioning spring; Fig. 5 is a side elevation thereof, Figs. 6 and 7 indicate suitable ways for fastening the ends of the springs; and Fig. 8 is a detail view showing the driving means for the fan.

10 indicates the chassis of an automobile and 11 the engine for propelling it. In front of the engine is a radiator 12 for cooling the circulating water of the engine. Hot water flows from the engine by the pipe 13 and the cool water returns to the engine jackets by the pipe 14. 15 designates a bracket and mounted thereon is a dynamo-electric machine 16 of any approved construction. On the shaft 17 of the rotor of said machine is a sprocket 18 which is connected by a chain 19 with a sprocket 20 on the shaft 21 of the engine. Mounted on the shaft 17 in front of the sprocket is a pulley 22 that drives the ventilating fan 23 through a belt 24, said fan being carried by a bracket 25 supported by the engine. The fan shaft has a pulley 26 over which the belt 24 passes.

Referring now to the cushioning device or elastic drive, 17 indicates the machine shaft and secured thereto by a key 27 is one of the principal members of the pulley. It comprises a hub 28 through which the shaft passes, a front wall or web 29 and a rim carried by said web over which the belt 24 runs. The inside of the rim is turned true to form a housing having a wall 30 with which the outer surface of the coiled spring 31 engages as will appear more fully hereinafter. 32 indicates the other principal member of the pulley which is loosely mounted on the hub 28 of the first member. That is to say, it can turn angularly with respect to the first. It is provided with recesses 33 of the character best shown in Fig. 3 into which extends projections 34 of similar shape that forms a part of the hub of the sprocket or pulley 18. The purpose is to form a simple jaw clutch so that the parts 32 and 34 will revolve as a unit. The clutch shown is very satisfactory because it provides large wearing faces such as 35, but other means can be employed to prevent independent angular movement of the two parts. The arrangement furthermore has the advantage that the pulley can be mounted in place and removed by a simple axial movement. This avoids the use of special securing means. Between the hub of the pulley and the shaft is a removable wearing sleeve or bushing 36. This permits the use of hardened teeth on the sprocket if desired. As above stated the two parts of the pulley are capable of relative angular movement and this movement is controlled by the spring 31, one end of said spring being fastened to the web member of the pulley and hence to the rim and the other to the member 32 which is locked to the hub of the sprocket. Figs. 4 to 7 show this feature in detail. The ends 37 of the spring are ground flat so as to afford long bearing surfaces. Registering with each end of the spring is a stop pin 38 and entering notches 39 near the spring ends are pins or screws 40. Two of these stop pins are carried by the member 29 and two by the member 32. When the dynamo-electric machine acts as a motor these pins acting on opposite ends of the spring tend to unwind it. A very slight relative angular movement of the two parts of the pulley suffices to force the outer faces of the turns of the spring into firm engagement with the finished inner face of the rim of the pulley and thereafter they transmit the power from one part to the other and the stress on the stop pins is very small.

To afford better bearing surface the periphery of the several turns of the spring are slightly flattened as by grinding. When the pulley is standing idle the outer surface of the spring just engages the inner surface of the pulley. To further assist in holding the ends of the spring the inner member 32 of the pulley has slightly raised end portions 41 that prevent radial movement of said ends and in this manner prevent them from getting out of alinement with the stop pins. The periphery of the member 32 between the portions 41 is slightly reduced in diameter so as to permit of the spring being wound up slightly. This action takes place when the engine drives the dynamo-electric machine as a generator to furnish current for any purpose. When this driving action takes place neither the outer nor inner surfaces of the middle turns of the spring are in contact with the members of the pulley and hence the drive is wholly elastic. On account of this, the changes in angular speed of the engine shaft, due to sudden changes in the amount of combustible admitted to the engine, or to faulty ignition, or both, will be absorbed by the spring, and as a result shocks will not be imparted to the driving means or connection whether it comprises toothed gear wheels or sprockets and chain. The permissible relative angular movement of the parts of the pulley may be varied to suit the operating conditions. For most installations a total angular movement of slightly less than 90 degrees will suffice, but it can be made more or less.

It is to be noted that the spring drive is between the engine and dynamo-electric machine shafts. The fact that it is incorporated in the pulley is immaterial in the broader aspects of the invention. By incorporating it in the pulley, however, I make one device perform two functions which, of itself, is an advantage in that it reduces the number of parts.

The principal feature to be noted is that the drive is positive where the torque transmitted is large, as in starting, and that the drive is elastic when the torque to be transmitted is small, or relatively so.

To restate, the operation is briefly as follows: The operator closes a switch which admits current to the dynamo-electric machine and it immediately starts as a motor and drives the engine. The stop pins immediately tend to unwind the spring thus forcing the turns into firm engagement with the inner wall of the surrounding housing, in this case, the rim of the pulley. This is because the engine at this moment is stationary and hence the pins in the part 32 are held back by the engine, while those in the part 29 are rotated by the dynamo-electric machine. When the spring unwinds sufficiently, the drive is positive and direct because the turns of the spring have been expanded directly into engagement with the housing. The frictional contact between the turns of the spring and the inner wall of the housing takes the load. The practical use of my invention shows that the load on the stop pins is so small as not to cause any appreciable wear thereof. When the engine is started the relation of parts is not altered because of the work required to move it. As soon as the engine begins to fire the motor circuit communicating with the battery is interrupted and the dynamo-electric machine will be driven as a generator as soon as the speed reaches a predetermined value. From this time on the driving is wholly through the spring and it is under sufficient tension to keep the outer surfaces thereof free from the pulley rim. As the engine speed is changed the spring will absorb the sudden shocks and the driving means will run free and there will be no slatting of the chain or sudden shocks on the gear teeth.

It will be observed that the recess in the hub of the member 32 is only slightly smaller in diameter than the inside of the spring. I prefer to use this arrangement because it serves as a protector for the spring if the load due to the generator exceed the normal amount as it might if the car was driven at a very high speed. Under normal running conditions, however, the spring turns will always be out of engagement with said hub. Viewed from this point of view the spring is protected both when it tends to unwind and when it is wound up. Obviously the amount of clearance can be varied to suit the requirements.

42 illustrates the storage battery for supplying current to the dynamo-electric machine for starting the engine and which receives current therefrom when it is acting as a generator. 43 indicates a box containing a starting switch and also a switch for controlling the machine when acting as a generator. I have not illustrated these features in detail because they are of well known construction and are apparently unnecessary to an understanding of the invention.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. In combination, an internal combustion engine, a dynamo-electric machine which acts as a motor to start the engine, and after the engine is in operation is driven by it as a generator to furnish current, a driving connection between the engine and the rotor of said machine which transmits power from the machine shaft to the engine shaft and vice versa, said connection comprising two relatively movable members and a coiled spring connected at its ends to said members and whose turns closely fit one of the members so as to be confined against change in shape when the machine drives the engine and is free to yield when the engine drives the machine.

2. In combination, an internal combustion engine, a dynamo-electric machine which acts as a motor to start the engine and later as a generator to furnish current, a geared driving connection between the rotor of said machine which includes an elastic connection which is anchored at one end to one of the gears in the driving connection and at the other end to the shaft coöperating therewith, said elastic connection being arranged to yield and take up shocks when the machine is being driven by the engine, and means carried by a part of the driving connection which surrounds the elastic connection and confines the elastic connection against enlargement when said machine is acting as a motor.

3. In combination, an internal combustion engine, a dynamo-electric machine which acts as a motor to start the engine and later is driven thereby to furnish current, a geared driving connection between the engine shaft and that of the rotor of said machine which includes a spiral spring, one end of which is anchored to one of the gears in said connection and the other end to the shaft which carries said gear, said spring when the engine is driving said machine as a generator acting to absorb shocks due to variations of the angular speed of the engine shaft, and a housing for the spring which is engaged thereby when said machine is acting as a motor to drive the engine and through which power is transmitted.

4. In combination, an internal combustion engine, a dynamo-electric machine which acts as a motor to start the engine, and after the engine is in operation is driven by it as a generator to furnish current, a driving connection between the engine and the rotor of said machine which transmits power from the machine shaft to the engine shaft and vice versa, said connection including a spring which is confined against change in shape when the machine drives the engine and through which power is transmitted, and which is free to change its shape as it transmits power from the engine to said machine.

5. In combination, a driving shaft, a pair of members concentrically mounted thereon, one of which is fast on the shaft and the other loose, a coiled spring that encircles the shaft and is connected at its ends to said members and through which power is transmitted in both directions between them, and means rotating with one of the members for preventing any substantial change in the shape of the spring when it tends to unwind from its initial position.

6. In combination, a driving shaft, a pair of members concentrically mounted thereon, one of which is fast on the shaft and the other loose, a coiled spring that encircles the shaft and is located between the members, the turns of said spring being flattened on their outer faces, means connecting the ends of the springs to the two members, and means rotating with one of the members which engages with the flattened faces of the spring to restrict its deflections when one member drives the other through said spring.

7. In combination, a driving shaft, a member whose hub is rigidly secured to the shaft, a rotary housing, a second member which is mounted on said hub and is free to turn thereon, said driven member being surrounded by the housing, a coiled spring that is connected at its ends to the members to transmit power and whose turns just engage with the housing when no power is being transmitted, a power transmitting device that is also loosely mounted on the shaft, and a positive clutch between said device and the driven member which is releasable by a relatively axial movement of said members and device.

8. In combination, a driving shaft, a member whose hub is rigidly secured to the shaft, a housing carried by the member, the outer surface of which forms a pulley and the inner surface a spring retainer, a member that is mounted to turn slightly on said hub and which is inclosed by the housing, a coiled spring connected at its ends to the members for transmitting power in both directions and whose turns are arranged to contact with the inner surface of the housing, the latter acting to prevent the spring from changing its shape, a toothed gear mounted to turn angularly on the shaft, and a clutch between the second member and the gear which positively transmits motion from one to the other.

9. In combination, a driving shaft, a member having a hub that is rigidly secured to the shaft, a second member mounted to turn angularly with respect to the shaft, a coiled spring, the ends of which are connected to the members and which is initially without stress, a housing carried by one of the members which closely surrounds the turns of the spring and with which the turns are forced into engagement when the relative motion between the members is such as to stress the spring by unwinding it from its initial position, said spring being free of the housing when stressed in the opposite direction by winding, and means attached to the second member and carried by the shaft for transmitting motion.

In witness whereof, I have hereunto set my hand this 27th day of August, 1915.

ROBERT W. GOFF.